March 2, 1926.  A. H. KRUEGER  1,575,491

ADJUSTABLE AND FOLDABLE LUGGAGE CARRIER

Filed Sept. 4, 1924

Inventor
A. H. Krueger
By Watson E. Coleman
Attorney

Patented Mar. 2, 1926.

1,575,491

UNITED STATES PATENT OFFICE.

AUGUST H. KRUEGER, OF LURAY, KANSAS.

ADJUSTABLE AND FOLDABLE LUGGAGE CARRIER.

Application filed September 4, 1924. Serial No. 735,960.

*To all whom it may concern:*

Be it known that I, AUGUST H. KRUEGER, a citizen of the United States, residing at Luray, in the county of Russell and State of Kansas, have invented certain new and useful Improvements in Adjustable and Foldable Luggage Carriers, of which the following is a specification, reference being had to the accompanying drawings.

This invention relates to accessories for use in connection with motor vehicles, and has for its object the provision of a novel luggage carrier adapted to be clamped upon the running board of an automobile or the like for the purpose of facilitating the carrying of baggage or merchandise of various kinds.

An important object is the provision of a carrier of this character so mounted and arranged as to be capable of lateral adjustment with respect to the vehicle body and running board so that wide articles or objects may be carried as easily as narrow ones, means being provided for maintaining the desired adjusted position and positively preventing derangement or displacement of the parts.

A further object is the provision of a device of this character which is so formed that it may be folded or collapsed to lie substantially in registration with the edge of the running board in an out-of-the-way position.

An additional object is the provision of a carrier which will be simple, inexpensive in manufacture, easy to apply and adjust, positive in action, efficient and durable in service, and a general improvement in the art.

With the above and other objects and advantages in view, the invention consists in the details of construction and arrangement of parts to be hereinafter more fully described and claimed, and illustrated in the accompanying drawings, in which—

Referring more particularly to the drawings, the letter A designates a portion of an automobile body and B represents the running board thereof.

Figure 1:
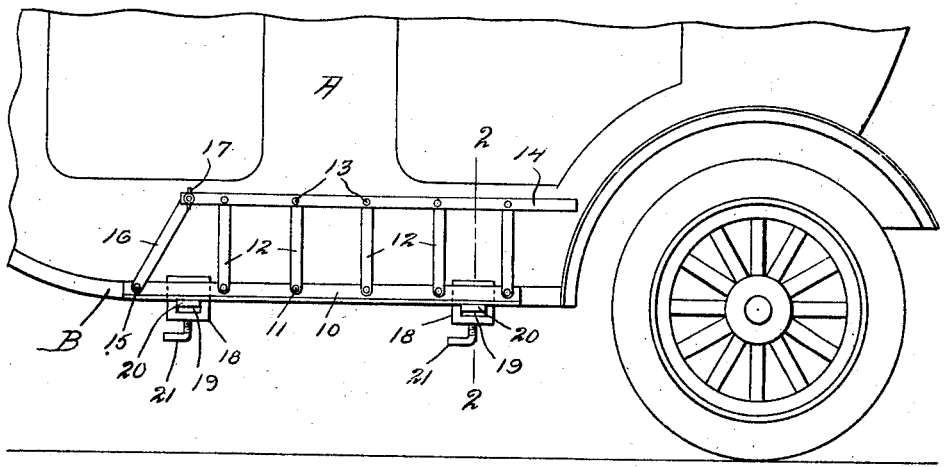
Figure 1 is a fragmentary side elevation of an automobile equipped with my carrier and showing it in operative position.
Figure 4:
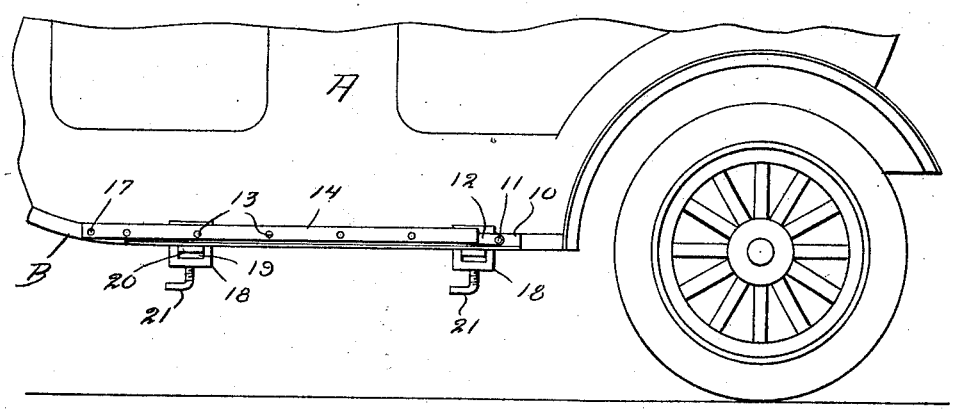
Figure 4 is a view similar to Figure 1 but showing the device collapsed or folded.

In carrying out my invention, I provide a carrier or retaining device including a bottom rail 10, to which are pivoted, at 11, normally upstanding links 12 which are in turn pivotally connected, at 13, with a top rail 14. At the forward end of the lower rail is pivoted, at 15, a brace link 16 which is detachably connected, at 17, with the forward end of the upper rail 14. Obviously, when the brace 16 is in its operative position, as shown in Figure 1, the device is incapable of folding or collapsing, whereas when the brace 16 is disconnected at the point 17 the upper rail 14 is capable of being swung downwardly onto or against the rail 10, as shown in Figure 4.

The attaching means for the device comprises a pair of U-shaped clamps 18 adapted to be straddlingly engaged upon the edge of the running board and formed with elongated slots 19 which receive and through which extend arms 20 suitably secured to the bottom rail 10 of the guard or carrier. Set screws 21 are provided on these clamps for the purpose of securing them to the running board and for the further purpose of holding the arms 20 in adjusted position with the guard rail structure disposed at any desired distance, within certain limits, from the edge of the running board.

Figures 2, 3:
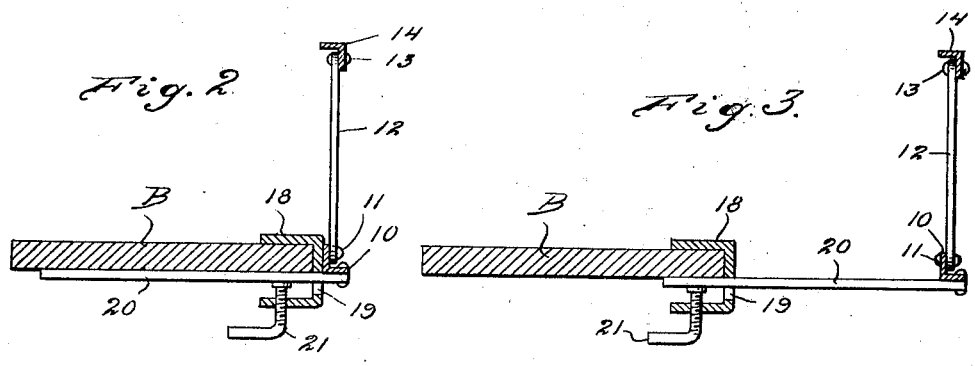
Figure 2 is a cross section on the line 2—2 of Figure 1.
Figure 3 is a similar view showing the carrier adjusted outwardly for carrying relatively wide articles or objects.

When it is intended to carry suit cases or other objects and articles which are comparatively narrow, the guard rail structure is adjusted so as to extend along the edge of the running board, as shown in Figure 2. When carrying egg cases, milk cans, or other articles of a rather wide nature, it is necessary to loosen the set screws 21 and move the guard rail or carrier outwardly with respect to the running board, as shown in Figure 3, subsequently to which the set screws are re-tightened to maintain the adjusted position.

From the foregoing description and a study of the drawings, it will be apparent that I have thus provided a simply constructed and inexpensive carrier which is readily attachable to any car having a running board without any necessity whatsoever for drilling or boring any holes, the clamping means disclosed being capable of mounting the device with ease and certainty regardless of the thickness of the running board. The lateral adjustability of the guard rail with respect to the running board is of vital importance, as it enables merchandise of various kinds to be readily transported upon the running board of an ordinary touring car, roadster or the like, thus avoiding the necessity for placing the articles or objects in the back of the car with resultant damage to the upholstering. A secondary feature of importance is the foldability or collapsibility of the device whereby it may be disposed in non-obstructing relation to the running board so that access to the car may be had from either side thereof.

While I have shown and described the preferred embodiment of the invention, it should be understood that I reserve the right to make such changes in the form, construction and arrangement of the parts as will not depart from the spirit of the invention or the scope of the subjoined claims.

Having thus described the invention, I claim:—

In combination with the running board of an automobile, a luggage carrier comprising, in combination, a plurality of U-shaped clamps straddling the free marginal portion of the running board at points spaced lengthwise thereof, each of the clamps being provided with a slot adjacent to the side member underlying the running board, the second side member of the clamp having direct contact with the running board from above, a set screw threaded through the under side member of each of the clamps, a guard rail structure, arms projecting laterally from the lower portion of said structure and disposed through the slot in the clamp, the set screws carried by the clamps being directly engageable with said arms to clamp said arms between the set screws and the running board and to hold the arms against lengthwise movement.

In testimony whereof I hereunto affix my signature.

AUGUST H. KRUEGER.